United States Patent
Hamou et al.

(10) Patent No.: US 9,500,859 B2
(45) Date of Patent: Nov. 22, 2016

(54) IDENTIFICATION VALUE OF A ROTATABLE ELEMENT HAVING A PLURALITY OF MIRROR FACETS

(71) Applicant: Hewlett-Packard Indigo, B.V., Amstelveen (NL)

(72) Inventors: Guy Hamou, Rehovot (IL); Michael Plotkin, Rehovot (IL); Haim Livne, Kfar-Sava (IL); Calanit Dotan, Nes Ziona (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 3 days.

(21) Appl. No.: 14/605,837

(22) Filed: Jan. 26, 2015

(65) Prior Publication Data
US 2016/0216511 A1 Jul. 28, 2016

(51) Int. Cl.
*G03G 15/04* (2006.01)
*G02B 26/12* (2006.01)
*G04F 13/02* (2006.01)
*G03G 15/043* (2006.01)

(52) U.S. Cl.
CPC .............. *G02B 26/12* (2013.01); *G03G 15/043* (2013.01); *G04F 13/02* (2013.01)

(58) Field of Classification Search
CPC ...... G03G 15/043; G04F 13/02; G02B 26/12

USPC ............................................................ 399/4
See application file for complete search history.

(56) References Cited

U.S. PATENT DOCUMENTS

| | | |
|---|---|---|
| 4,672,400 A | 6/1987 | Doggett |
| 5,109,149 A | 4/1992 | Leung |
| 5,838,001 A | 11/1998 | Minakuchi et al. |
| 7,916,374 B2 | 3/2011 | Nakajima |
| 2012/0281996 A1 | 11/2012 | Chen et al. |
| 2015/0062277 A1* | 3/2015 | Nito ..................... G03G 15/043 347/118 |

FOREIGN PATENT DOCUMENTS

EP   1030265 A2   8/2000

OTHER PUBLICATIONS

"The Technology of Color Laser Printing", 2004 http://www.xactiv.com/wp-content/uploads/2014/03/THE-TECHNOLOGY-OF-COLOR-LASER-PRINTING.pdf.

* cited by examiner

*Primary Examiner* — Sophia S Chen
(74) *Attorney, Agent, or Firm* — HP Inc Patent Department (57) ABSTRACT

A method determines an identification value of a rotatable element having a plurality of mirror facets. The identification value is determined based on a facet scan duration obtained of the mirror facets or based on a prismatic error of the mirror facets.

14 Claims, 10 Drawing Sheets

Determining an identification value of a rotatable element having a plurality of mirror facets, wherein the identification value is determined based on a facet scan duration obtained of the mirror facets — S100

FIG 1

Determining an identification value of a rotatable element having a plurality of mirror facets, wherein the identification value is determined based on a prismatic error of the mirror facets — S102

FIG 2

Analyzing facet scan durations for the mirror facets to reveal the relative lag among the mirror facets that reflects the prismatic error — S104

Combining the sequence of lags for each mirror facet to form the identification value — S106

|   | S/N | absolute time (s) | differences (s) | average time per cycle (s) | jitter per facet (s) | jitter per facet (ps) | jitter mod detection limits (ps) |
|---|---|---|---|---|---|---|---|
|   | 1 | 2.00E-21 |   |   |   |   |   |
|   | 2 | 2.62E-04 | 2.62E-04 |   | 2.85E-09 | 2.85E+03 | 2.80E+03 |
|   | 3 | 5.25E-04 | 2.62E-04 |   | -2.04E-09 | -2.04E+03 | -2.20E+03 |
| #1 | 4 | 7.87E-04 | 2.62E-04 | 2.62E-04 | -7.05E-09 | -7.05E+03 | -7.20E+03 |
|   | 5 | 1.05E-03 | 2.62E-04 |   | -2.62E-09 | -2.62E+03 | -2.80E+03 |
|   | 6 | 1.31E-03 | 2.62E-04 |   | 1.99E-09 | 1.99E+03 | 1.80E+03 |
|   | 7 | 1.57E-03 | 2.62E-04 |   | 6.88E-09 | 6.88E+03 | 6.80E+03 |
|   | 8 | 1.84E-03 | 2.62E-04 |   | 2.99E-09 | 2.99E+03 | 2.80E+03 |
|   | 9 | 2.10E-03 | 2.62E-04 |   | -1.71E-09 | -1.71E+03 | -1.80E+03 |
| #2 | 10 | 2.36E-03 | 2.62E-04 | 2.62E-04 | -7.72E-09 | -7.72E+03 | -7.80E+03 |
|   | 11 | 2.62E-03 | 2.62E-04 |   | -2.06E-09 | -2.06E+03 | -2.20E+03 |
|   | 12 | 2.89E-03 | 2.62E-04 |   | 1.99E-09 | 1.99E+03 | 1.80E+03 |
|   | 13 | 3.15E-03 | 2.62E-04 |   | 6.51E-09 | 6.51E+03 | 6.40E+03 |
|   | 14 | 3.41E-03 | 2.62E-04 |   | 3.49E-09 | 3.49E+03 | 3.40E+03 |
|   | 15 | 3.67E-03 | 2.62E-04 |   | -1.88E-09 | -1.88E+03 | -2.00E+03 |
| #3 | 16 | 3.93E-03 | 2.62E-04 | 2.62E-04 | -7.43E-09 | -7.43E+03 | -7.60E+03 |
|   | 17 | 4.20E-03 | 2.62E-04 |   | -2.08E-09 | -2.08E+03 | -2.20E+03 |
|   | 18 | 4.46E-03 | 2.62E-04 |   | 1.34E-09 | 1.34E+03 | 1.20E+03 |
|   | 19 | 4.72E-03 | 2.62E-04 |   | 6.56E-09 | 6.56E+03 | 6.40E+03 |
|   | 20 | 4.98E-03 | 2.62E-04 |   | 2.97E-09 | 2.97E+03 | 2.80E+03 |
|   | 21 | 5.25E-03 | 2.62E-04 |   | -2.54E-09 | -2.54E+03 | -2.60E+03 |
| #4 | 22 | 5.51E-03 | 2.62E-04 | 2.62E-04 | -7.64E-09 | -7.64E+03 | -7.80E+03 |
|   | 23 | 5.77E-03 | 2.62E-04 |   | -1.81E-09 | -1.81E+03 | -2.00E+03 |
|   | 24 | 6.03E-03 | 2.62E-04 |   | 2.07E-09 | 2.07E+03 | 2.00E+03 |
|   | 25 | 6.29E-03 | 2.62E-04 |   | 6.95E-09 | 6.95E+03 | 6.80E+03 |

150, 152, 154, 156, 158, 160

|   | #1 jitter 1 (ps) | #2 jitter 2 (ps) | #3 jitter 3 (ps) | #4 jitter 4 (ps) | AVG (ns) |
|---|---|---|---|---|---|
| F1 | 2.80E+03 | 2.80E+03 | 3.40E+03 | 2.80E+03 | 2.950 |
| F2 | -2.20E+03 | -1.80E+03 | -2.00E+03 | -2.60E+03 | -2.150 |
| F3 | -7.20E+03 | -7.80E+03 | -7.60E+03 | -7.80E+03 | -7.600 |
| F4 | -2.80E+03 | -2.20E+03 | -2.20E+03 | -2.00E+03 | -2.300 |
| F5 | 1.80E+03 | 1.80E+03 | 1.20E+03 | 2.00E+03 | 1.700 |
| F6 | 6.80E+03 | 6.40E+03 | 6.40E+03 | 6.80E+03 | 6.600 |

IDENTIFICATION VALUE OF A ROTATABLE ELEMENT HAVING A PLURALITY OF MIRROR FACETS

BACKGROUND

Electrostatic printing systems generate a latent electrostatic image on a photoconductor member using an optical scanning unit, which includes a rotatable element having a plurality of mirror facets, e.g., a rotating hexagonal mirror. A toner image is developed on the photoconductor member and is transferred, either directly or indirectly, to a medium. The toner is transferred electrostatically to the photoconductor member from a developer unit. Some electrostatic printing systems may use a dry toner powder whereas other printing systems, such as liquid electro-photographic (LEP) printing systems, may use a liquid toner.

DETAILED DESCRIPTION

Electrostatic printing systems include an optical scanning unit to selectively develop the pixels of an image to be produced on a photoconductor member. The optical scanning unit may also be referred to as a writing head of the printing system. In case of a laser printing system the optical scanning unit may also be referred to as laser scanning unit or laser raster scanning unit. The optical scanning unit includes a rotatable element having a plurality of mirror facets which may be also referred to as a scanning element. The scanning element may include a hexagonal disc rotating at a speed and having six facets which serve as respective mirrors to deflect an incident beam of electromagnetic radiation, like a laser beam or a light beam.

The optical and mechanical qualities of the scanning element determine the performance of the optical scanning unit and the print quality of the printing system. During manufacturing and assembly the scanning element undergoes several inspections and qualification tests. The scanning element may be tested after its manufacturing is completed, e.g., to determine whether the completed scanning element has dimensions in accordance with a specification. Testing may also include assembly of the scanning element on a motor, e.g., to determine whether it fulfils a specification during rotation. A further test may be carried out once the scanning element has been placed inside the optical scanning unit.

Once the scanning element is assembled inside the optical scanning unit it is difficult to track the installed scanning element. When assembled, the scanning element is arranged inside the optical scanning unit and it is difficult to directly access the installed scanning element to identify it. One possibility to identify the installed scanning element in the optical scanning unit is to use a register or a table in which the installed scanning element is registered or listed. The register/table is prepared by a human, for example a technician who assembled the optical scanning unit or carried out a repair. The register/table relies on the accuracy of the technician to register/list the scanning element correctly or at all. Therefore, the register/table may be partially or completely incorrect. Replaced or repaired scanning elements may not have been registered/listed. There may be situations in which a scanning element is listed to be installed in more than one optical scanning unit.

The performance of the optical scanning unit and the overall print quality of a printing system also relies on the performance of the scanning element. The limited access to the scanning element and/or the partially or completely incorrect register/table may limit the ability to identify the installed scanning element. This makes it difficult to monitor the behavior of a scanning element and to investigate situations in which a performance deterioration of the printing system is due to a malfunction of the scanning element. In other words, it may be difficult to investigate print quality issues in a printing system which may be related to the performance of the scanning element. Also, it may be difficult to correlate the deterioration of the printing system with a specific production batch for the scanning elements.

Barcodes or RFID approaches may be used for identifying a scanning element. The scanning element may have a barcode or an RFID tag provided thereon. This may not be desired as it changes the properties of the scanning element. In case a barcode or an RFID tag may not be applied to the scanning element, the motor unit used for rotating the scanning element may have associated therewith the barcode or the RFID tag. In such a situation, when the scanning element is replaced, the information associated with the barcode/RFID tag no longer reflects the new scanning element which may further increase confusion and uncertainty with regard to what kind of scanning element is actually used inside the optical scanning unit. Thus, even when using a barcode or an RFID tag it may be difficult to identify the scanning element beyond doubt. Further, additional hardware is provided in the optical scanning unit, e.g., an additional barcode reader or RFID reader inside the optical scanning unit, which may add to an overhead during manufacturing, may increase the size of the optical scanning unit and costs.

The techniques described herein determine an identification value of a rotatable element having a plurality of mirror facets based on a facet scan duration obtained from the mirror facets or based on a prismatic error of the mirror facets.

Figure 1:
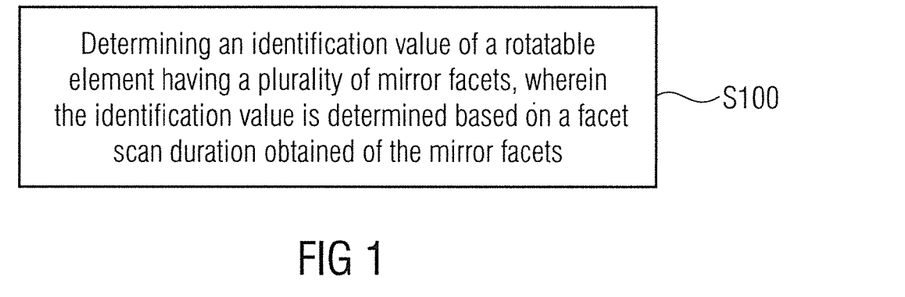
FIG. 1 is a flow diagram outlining an example of a method for determining an identification value of a rotatable element.

FIG. 1 is a flow diagram outlining an example of a method for determining an identification value of a rotatable element, like a rotatable hexagonal mirror disc described in further detail below. As is shown at S100 the method includes determining an identification value of a rotatable element having a plurality of mirror facets, wherein the identification value is determined based on a facet scan duration obtained of the mirror facets.

Figure 2:
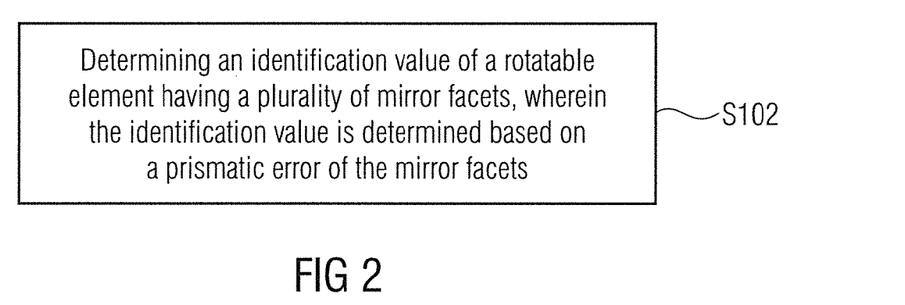
FIG. 2 is a flow diagram outlining another example of a method for determining an identification value.
Figure 3:
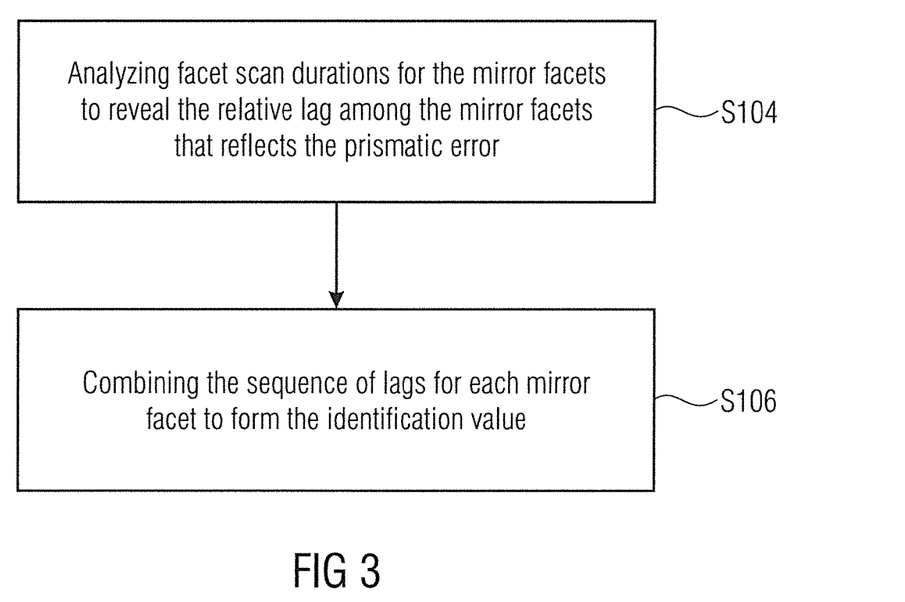
FIG. 3 is a flow diagram outlining the determination of the identification value of an prismatic error in accordance with an example.

FIG. 2 is a flow diagram outlining another example of a method for determining an identification value. As is indicated at S102, the identification value of a rotatable element having a plurality of mirror facets is determined based on a prismatic error of the mirror facets. FIG. 3 is a flow diagram outlining the determination of the identification value of the prismatic error in accordance with an example. At S104 a facet scan duration for the mirror facets is analyzed for revealing the relative lag among the mirror facets that reflects the prismatic error, and the sequence of lags for each mirror facet is combined to form the identification value, as is shown at S106.

Determining the identification value of the rotatable element, which may also be referred to as scanning element or mirror disc, on the basis of the facet scan duration obtained from the mirror facets or on the basis of the prismatic error of the mirror facets allows identifying the rotatable element without modification of the structure thereof, like adding barcodes, thereby allowing for a robust and active tracking for such scanning elements. Also, the optical scanning unit is not modified.

The following description makes reference to a hexagonal mirror disc as one possible form of the scanning element. However, the techniques described herein may also apply to scanning elements having a different structure, i.e., to a scanning element having a different number of mirror facets, for example less than six mirror facets or more than six mirror facets.

Figure 4:
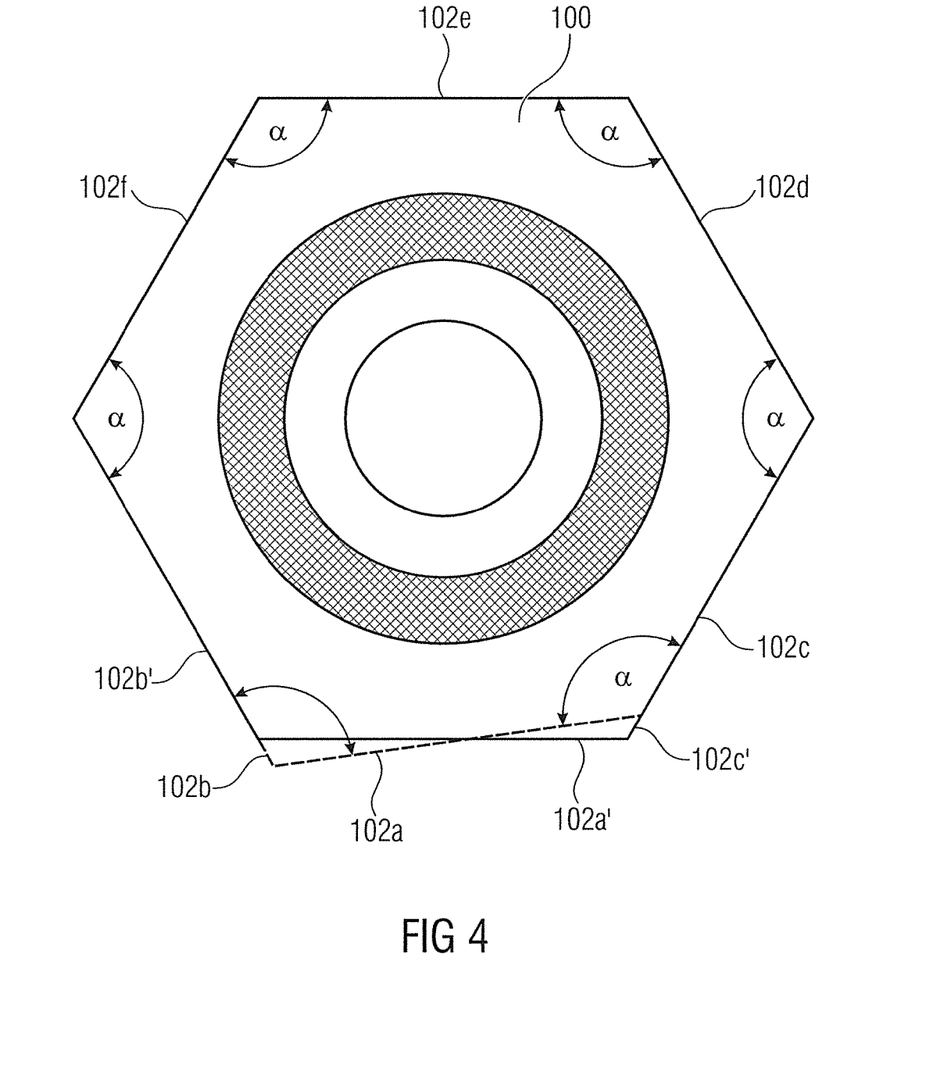
FIG. 4 is an example of a schematic representation of a rotatable hexagonal mirror disc having six mirror facets.

FIG. 4 is a schematic representation of a rotatable hexagonal mirror disc 100 having six mirror facets 102a to 102f. A prismatic error is schematically depicted by the deviation of the mirror facets 102a to 102c from the mirror facets 102a' to 102c' of a perfect theoretical hexagon mirror disc. These deviations may be due to production tolerances of the hexagonal mirror disc 100, and allow for exclusively identifying the hexagonal mirror disc 100 by measuring the time during which a light beam is reflected or scanned by the respective mirror facets 102a to 102f. The time during which a light beam is reflected or scanned a mirror facet may be referred to as a facet scan duration. The identification value of the rotatable hexagonal mirror disc 100 may be generated on the basis of the facet scan duration obtained from the mirror facets. In accordance with examples, measuring the time during which a light beam is reflected or scanned by the respective mirror facets 102a to 102f allows calculating the prismatic error and uniquely identifying the hexagon mirror disc 100 on the basis of the prismatic error. The hexagon mirror disc 100 depicted in FIG. 4 may be produced in accordance with a manufacturing specification defining that a prismatic angle α between adjacent facets has a tolerance of ±30 arc-seconds so that every two adjacent facets are 120°±30" apart. A deviation from these values may desynchronize a laser beam scan time with a print process progress, which may be evident as a gap or an overlap between subsequent scans. The tolerance of ±30 arc-seconds translates into 72 ns of scan time so that, when measuring the time differences between the six consecutive start of scan events, the respective time differences will be in average about 262 µs and each difference will have a constant variation of up to 36 ns. These variations reflect the deviation of the hexagon mirror disc 100 from a perfect theoretical hexagon. These differences may be measured with an accuracy of ±100 picoseconds, and a sequence of normalized time differences may be identified at any constant rotation speed.

In accordance with the techniques described herein, the hexagonal mirror disc 100 or the motor supporting the hexagonal mirror disc 100 do not include barcodes or the like. The identification or identification value of the hexagonal mirror disc 100 may be obtained by performing a measurement of the facet scan duration of the mirror facets or by a measurement of the prismatic error of the mirror facets. For example, after manufacturing the hexagonal mirror disc 100 its identification value may be determined by placing the hexagonal mirror disc 100 on a motor, rotating it and measuring the time during which a light beam is reflected or scanned by the respective mirror facets 102a to 102f. Once the unique identification value is known it may be recorded so that, for example, each hexagonal mirror disc of a production batch is uniquely identified. In other words, providing the identification value after manufacturing allows associating each hexagonal mirror disc used in an optical scanning unit to the production batch in which it was manufactured. Once the hexagonal mirror disc 100 has been mounted into the optical scanning unit, it is not readily accessible from the outside. However, the identification value is easily derived by performing the measurement of the facet scan duration or the prismatic error of the mirror facets while the hexagonal mirror disc 100 is arranged inside the optical scanning unit. For example, at every startup of a printing system the identification value of the hexagonal mirror disc 100 is determined and may be stored in a memory associated with the optical scanning unit. The identification value of the hexagonal mirror disc 100 may be read out, for example, for investigating printing quality issues related to the performance of the hexagonal mirror disc 100. Alternatively, the identification value may be determined by the optical scanning unit when a specific event occurred, for example after a predefined number of starts of the printing system or in case a repair of the printing system is recognized. For example, in case of the replacement of the hexagonal mirror disc 100 during the repair of the optical scanning unit, the new hexagonal mirror disc 100 may be identified on the basis of its identification value generated by the optical scanning unit.

In the following an example is described for determining the identification value of the hexagonal mirror disc using an optical scanning unit of a printing system. In accordance with other techniques the identification value may be determined by a manufacturer of the hexagonal mirror disc using a test site. The test site may be used to determine the identification value of a newly manufactured hexagonal mirror disc prior to installing it into an optical scanning unit for a printing system. A structure as described below may be used at the test site for determining the identification value of the hexagonal mirror disc.

Figure 5:
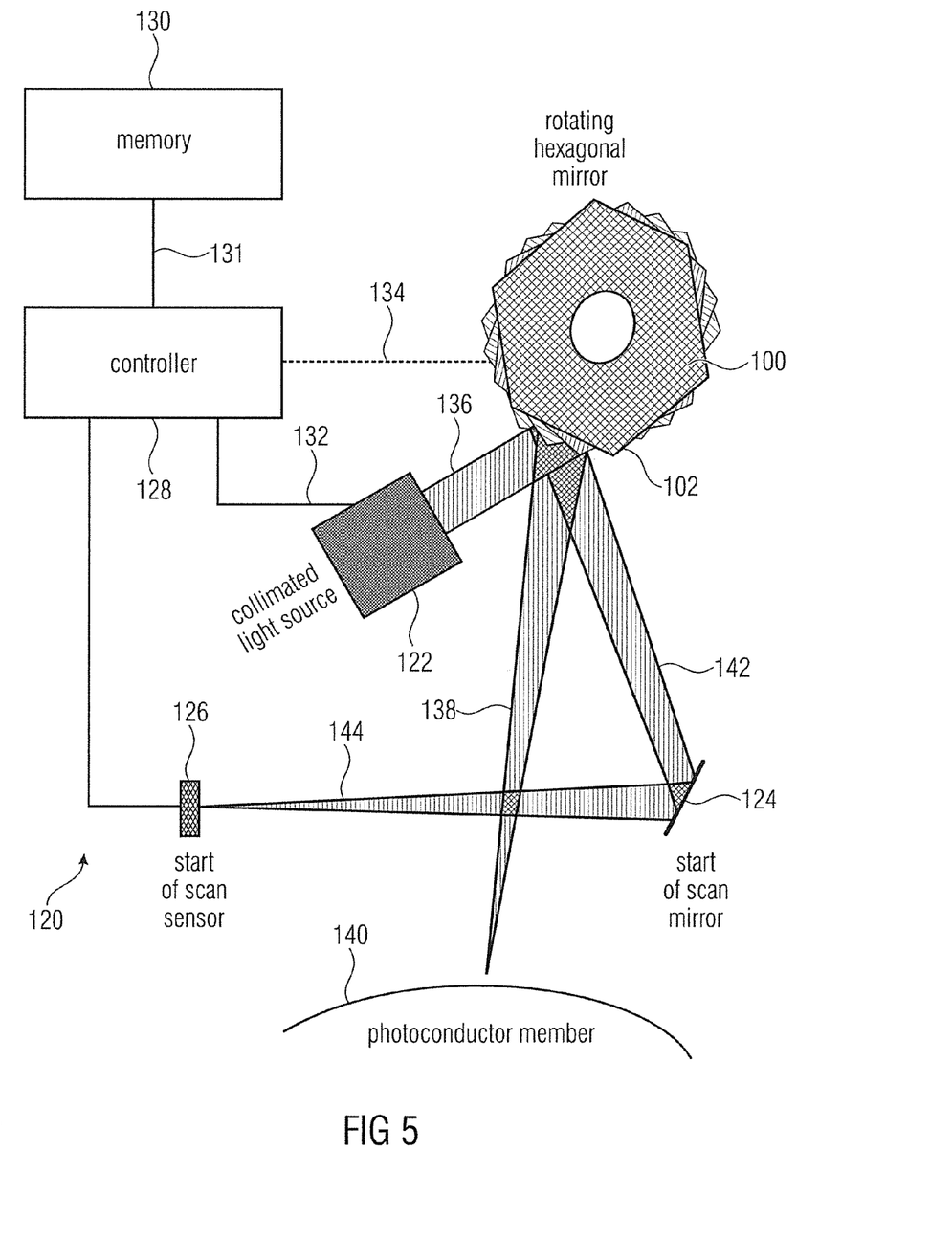
FIG. 5 is an example of a schematic representation of an optical scanning unit which may be used in an electro-photographic printing system.

FIG. 5 is a schematic representation of an optical scanning unit which may be used in an electro-photographic printing system. The optical scanning unit 120 includes the rotating hexagonal mirror 100 and a collimated light source 122, for example a laser light source. The optical scanning unit 120 further includes a start of scan mirror 124, a start of scan sensor 126, and a controller 128 which, in accordance with examples may be part of the optical scanning unit 120 or may be part of the overall printing system in which the optical scanning unit 120 is installed. The optical scanning unit 120 further includes a memory 130 that is coupled to the controller 128, as is schematically depicted by the line 131. The memory 130 may be part of the optical scanning unit 120 or may be part of the overall printing system in which the optical scanning unit is installed. The controller 128 may control the light source 122 and the hexagonal mirror disc 100, as is schematically depicted by the lines 132 and 134. The controller 128 may cause the light source 122 to output a laser beam 136 that is directed towards the hexagonal mirror disc 100 and hits one of the facets 102. The reflected laser beam 138 is directed onto a surface of a photoconductor member 140 of the printing system for generating the latent electrostatic image thereon. The controller 128 may control the light source 122 in accordance with the image information received. Further, the controller may control rotation of the hexagonal mirror disc 100, for example by controlling a motor (not shown) causing a rotation of the hexagonal mirror disc 100. The light source 122 and the hexagonal mirror disc 100 are positioned such that when rotating one of the facets 102 into the laser beam 136, at the beginning of the scanning by the respective facets 102 the laser beam 136 is directed to the start of scan mirror 124, as is schematically shown by the laser beam 142. The start of scan mirror 124 redirects the laser beam 142 to the start of scan sensor 126, as is schematically shown by the redirected laser beam 144. Dependent on the configuration of the optical scanning unit 120 the start of scan mirror 124 may be omitted and the start of scan sensor 126 may be placed such that it directly receives the laser beam 142 at the beginning of the scan by a facet 102 of the hexagonal mirror disc 100. The start of scan sensor 126 is coupled to the controller, as is schematically depicted by the line 146, and provides to the controller 128, which may also be referred to as an electronics module, respective signals indicative of the beginning of the scan by one of the mirror facets 102 of the hexagonal mirror disc 100. The beginning of the scan by one of the mirror facets 102 of the hexagonal mirror disc 100 may also be referred to as a start of scan event, and a signal indicative of the beginning of the scan by one of the mirror facets 102 may be referred to as a start of scan signal.

In the following an example will be described for determining the identification value of the hexagonal mirror disc 100 installed in the optical scanning unit 120. A similar structure may be used at a production site of the hexagonal mirror disc for initially determining an identification value of a hexagonal mirror disc which has been fabricated and which has not yet been installed into the optical scanning unit.

The time intervals between subsequent start of scan events are measured, for example by measuring the time difference between two start of scan signals received from the start of scan sensor 126 using the controller 128 of the optical scanning unit 120. The controller may include a time interval analyzer sampling element having a resolution of, for example, 75 ps. The time intervals or time differences between subsequent start of scan events are analyzed as groups of six as the six facets 102a to 102f of the hexagonal mirror disc 100 make up a complete or 360° rotation.

Figure 6:
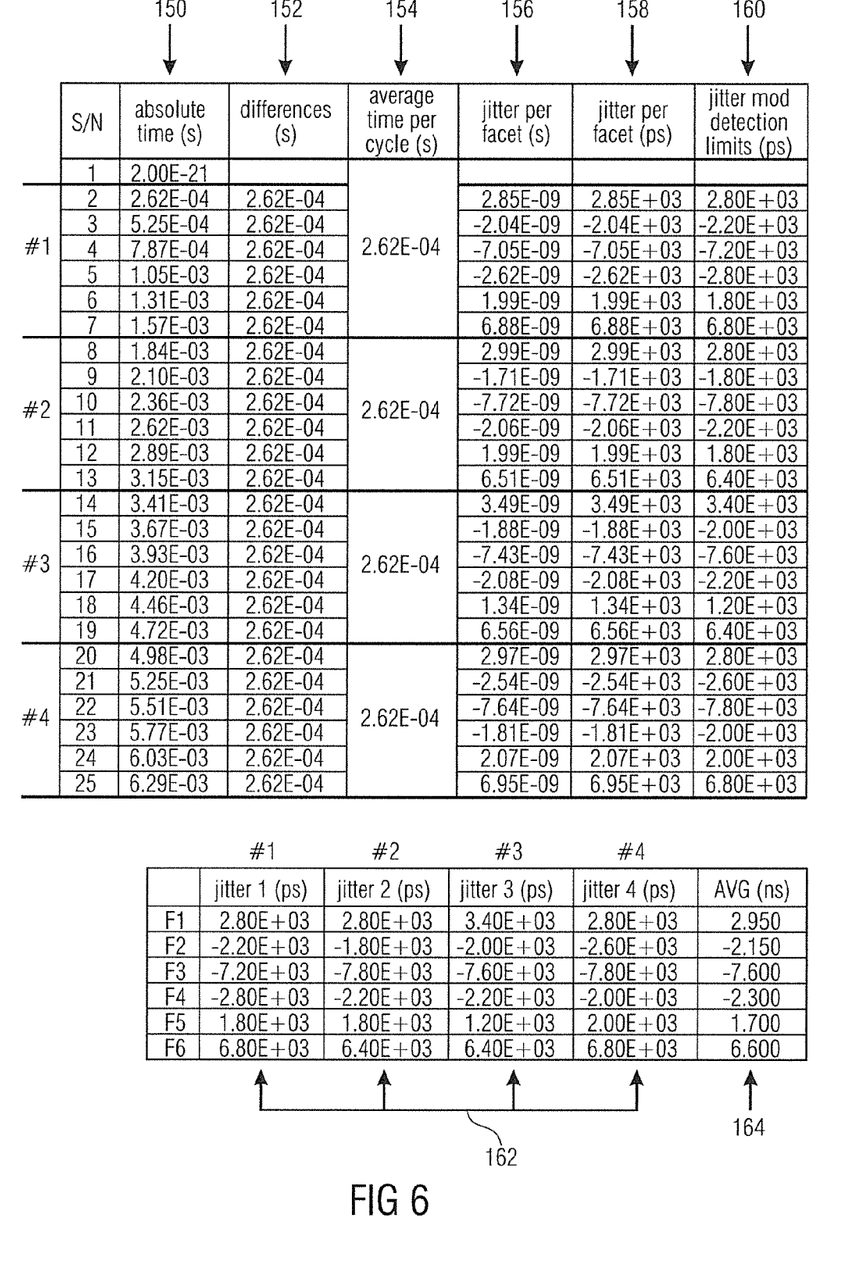
FIG. 6 is a table indicating the measurements performed and the results of calculations carried out in accordance with examples of the techniques described herein.

FIG. 6 shows a table indicating the respective measurements performed and the results of additional calculations carried out in accordance with examples of the techniques described herein. The results of four cycles #1 to #4 are indicated in FIG. 6, however, the number of cycles analyzed may be higher or lower. Column 150 indicates the absolute time at which a start of scan signal appeared. Column 150 indicates the absolute times measured by the controller 128 of the optical scanning unit 120 at which a signal was received from the start of san sensor 126. The respective absolute times are indicated for the cycles #1 to #4. On the basis of the absolute times measured, for each of the cycles #1 to #4, the time differences between subsequent start of scan events are determined, as is indicated in column 152. Column 152 indicates the values in "seconds", however, the actual differences are in the range of picoseconds so that the values shown in column 152 actually differ. The values in column 152 indicate the time difference or the duration of a scan by one facet of the hexagonal mirror disc 100. On the basis of the six values for each cycle #1 to #4 an average time between start of scan events for a complete 360° rotation of the hexagonal mirror disc 100 is calculated which is indicated for each cycles #1 to #4 in column 154. For each facet the time difference given in column 152 is subtracted from the average time per cycle given in column 154 which yields the deviation of the facet scan duration from the average duration. The deviation is given for each facet in column 156. In column 156 the values are given in "seconds", which are converted into the picoseconds range as is indicated in column 158. In accordance with examples of the techniques described herein, the deviation may be corrected according to the detection limits of the controller 128 yielding the corrected deviation values which are indicated in column 160. The values given in columns 156, 158 or 160 reveal the relative lag among the six facets of the hexagonal mirror disc 100.

In the lower part of FIG. 6, the corrected deviation values for the four cycles are shown at 162 as well as the average deviations for the respective facets of the hexagonal mirror disc 100 which are shown at 164. The values shown at 162 are indicative of the relative lag among the facets, and the average values indicated at 164 for each facet are indicative of the prismatic error of the hexagonal mirror disc. The lags are due to the allowed manufacturing tolerances for the hexagonal mirror disc, more specifically, due to the allowed tolerance of the angle between adjacent facets. Each hexagonal mirror disc being within the manufacturing specification will show different lags among the facets and the sequence of the lags for each hexagonal mirror disc is unique and may serve as an identification value or fingerprint for the hexagonal mirror disc that may be used for tracking and/or identifying the hexagonal mirror disc. This may be done, as mentioned above, during production of the hexagonal mirror disc, during assembly of the hexagonal mirror disc into the optical scanning unit and when the hexagonal mirror disc is fully running in an optical scanning unit mounted inside a printing system.

Figure 7:
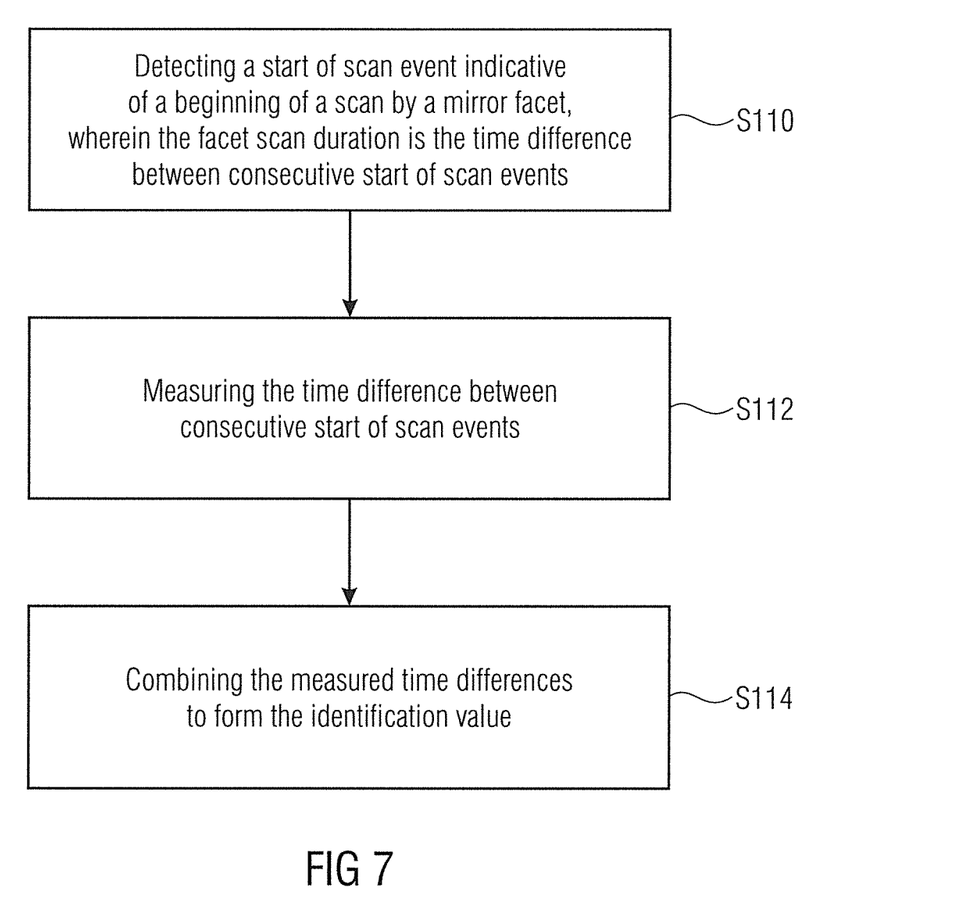
FIG. 7 is a flow diagram outlining an example of a method for determining an identification value for obtaining the results indicated in the table of FIG. 6.

FIG. 7 is a flow diagram outlining an example of a method for determining an identification value for obtaining the results indicated in the table of FIG. 6. At S110 a start of scan event is detected, for example by the start of scan sensor 126 (see FIG. 5). The start of scan event indicates the beginning of a scan by one of the mirror facets 102 of the hexagonal mirror 100. The facet scan duration is the time difference between two consecutive start of scan events, and examples for this time difference are given in column 152 in FIG. 6. At S112 the time differences between consecutive start of scan events are measured and combined at S114 to form the identification value.

Figure 8:
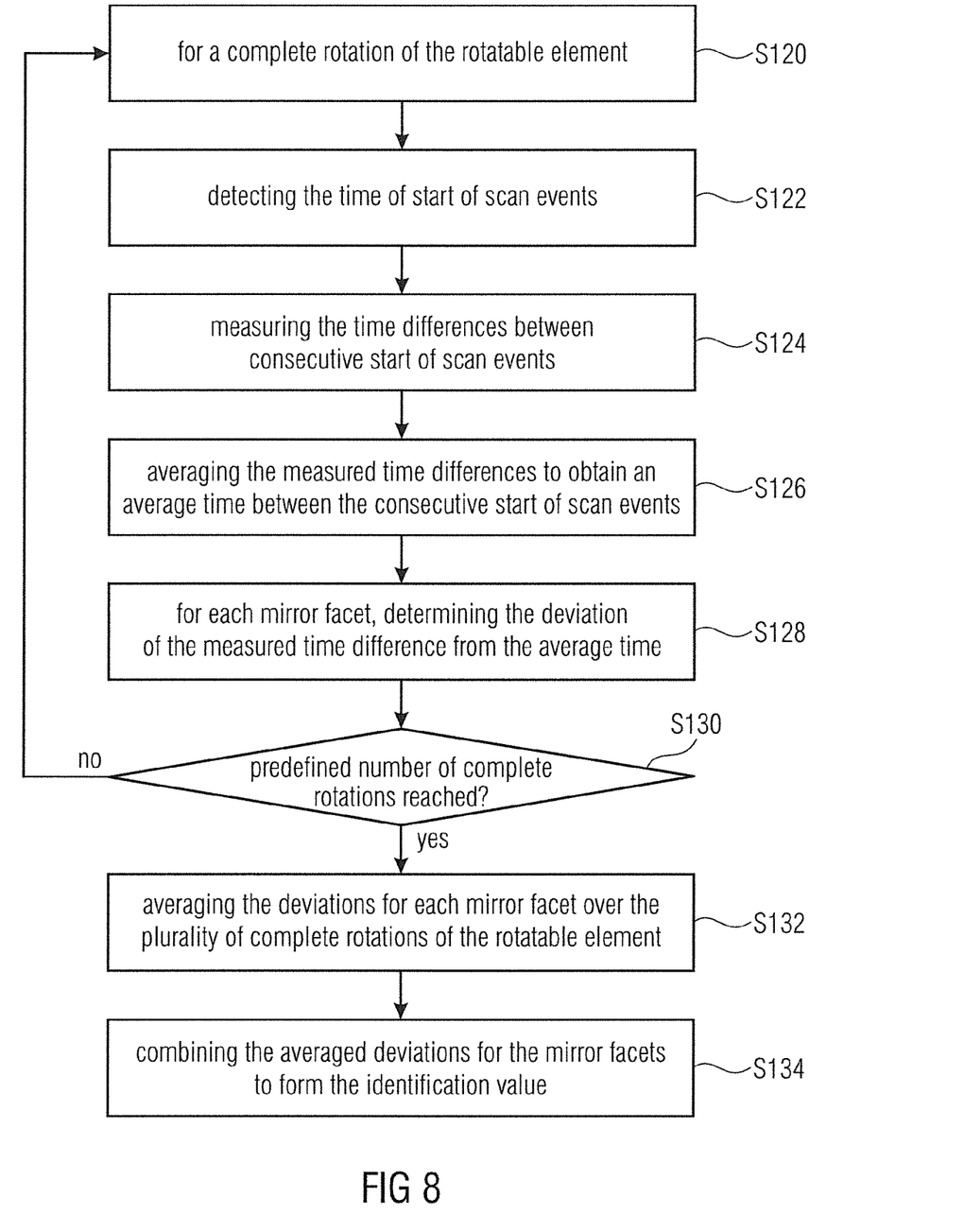
FIG. 8 is a flow diagram outlining further details of the method of FIG. 7 for determining the identification value in accordance with another example.

FIG. 8 is a flow diagram outlining further details of the method of FIG. 7 for determining the identification value in accordance with another example. As is indicated at S120 the subsequently described detecting, measuring, averaging and determining are performed for a complete rotation of the hexagonal mirror disc 100. Over the complete rotation of the hexagonal mirror disc 100 the times of start of scan events are detected at S122. The detected times are, for example, indicated in column 150 in FIG. 6. At S124 the time differences between consecutive start of scan events are measured (see for example the results indicated in column 152 in FIG. 6). The measured time differences are averaged at S126 to obtain the average time between the consecutive start of scan events. The average times are for example shown in column 154 in FIG. 6. At S128, for each mirror facet 102, the deviation of the measured time differences from the average or mean time is determined. The results are indicated, for example, in columns 156 to 160 and at 162 in FIG. 6. In accordance with examples, it is determined at S130 whether a predefined number of complete rotations has been reached or not. In case the number of complete rotations does not match the predefined number, the detecting S122, the measuring S124, the averaging S126 and the determining S128 are repeated. Once the desired number of rotations has been completed, the deviations for each mirror facet over the plurality of complete rotations are averaged at S132, which yields, for example, the values indicated at 164 in FIG. 6. These averaged deviations are then combined at S134 to form the identification value.

Figure 9A:
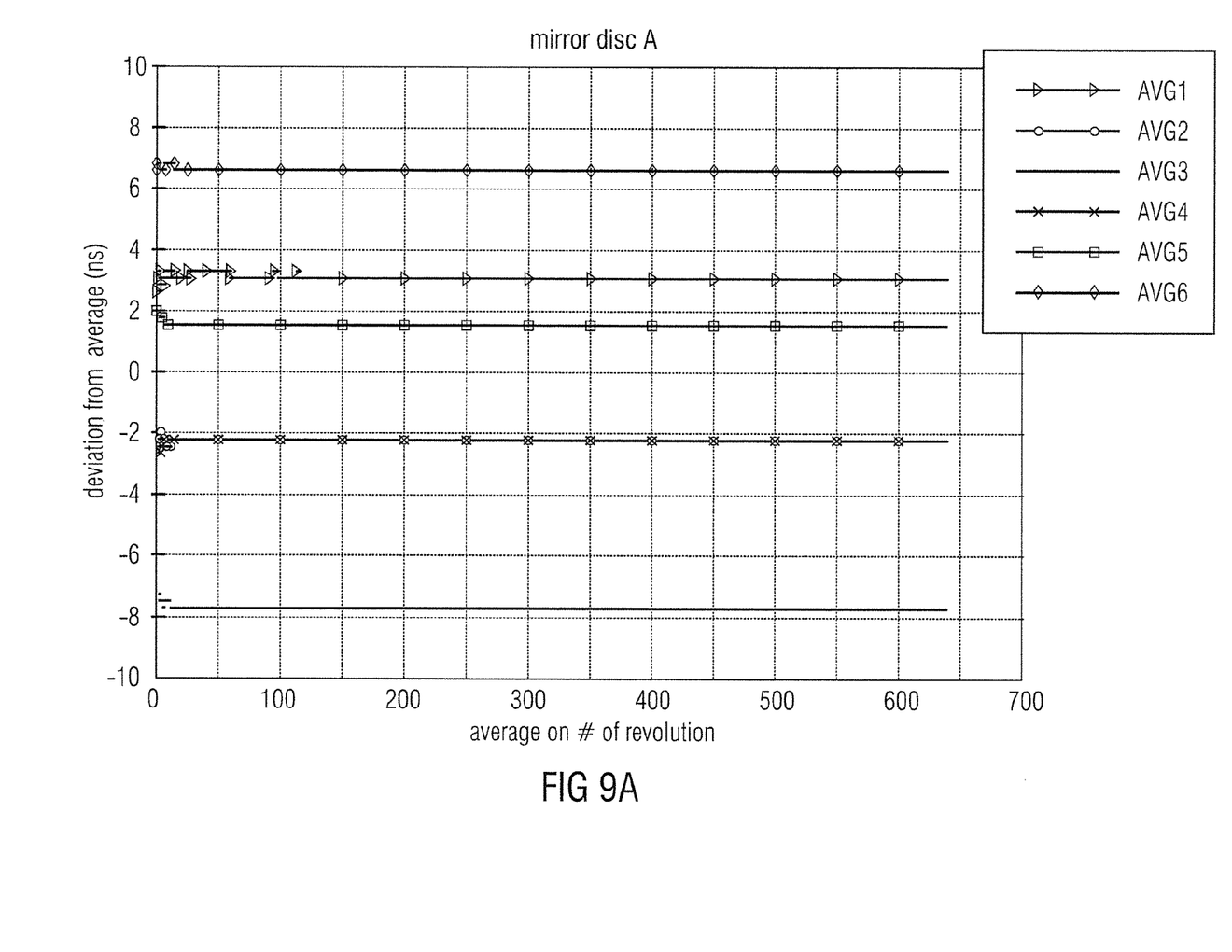
FIG. 9A shows examples of measurement results obtained for a hexagonal mirror disc A.
Figure 9B:
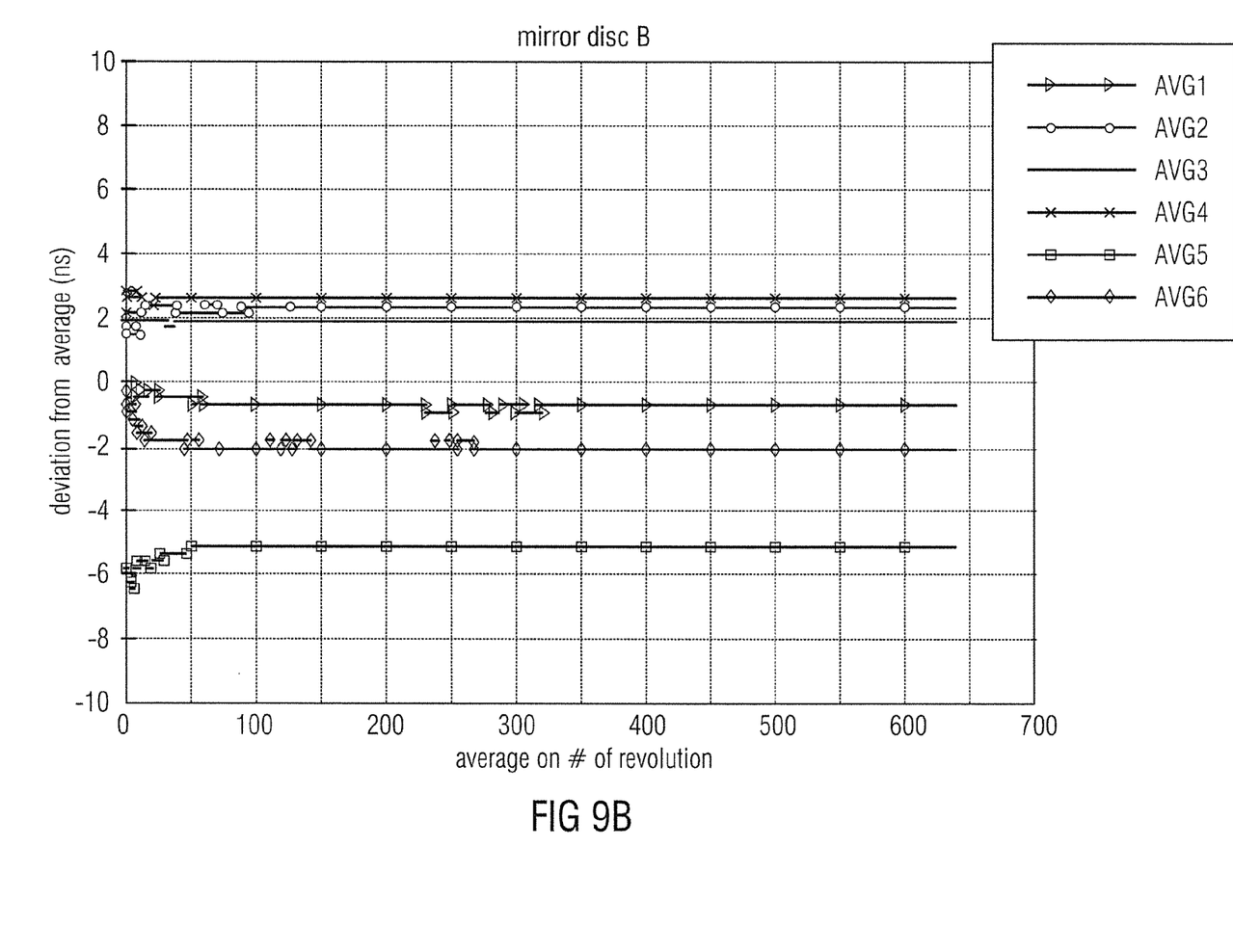
FIG. 9B shows examples of measurement results obtained for a hexagonal mirror disc B.

FIGS. 9A and 9B show examples of the results obtained by performing the above described measurements and calculations for two different mirror discs, wherein FIG. 9A shows the average deviations AVG1 to AVG6 for the respective facets obtained for a hexagonal mirror disc A which have been obtained during a measurement over about 640 cycles or revolutions, and wherein FIG. 9B shows the average deviations AVG1 to AVG6 for the respective facets obtained for a hexagonal mirror disc B.

The sequence of lags in nanoseconds for hexagonal mirror disc A are as follows:

| AVG1 | AVG2 | AVG3 | AVG4 | AVG5 | AVG6 |
|---|---|---|---|---|---|
| ≈3.1 | ≈−2.1 | ≈−7.9 | ≈−2.1 | ≈1.8 | ≈6.5 |

This sequence of deviations is unique for hexagonal mirror disc A and allows identifying the hexagonal mirror disc A when being installed into an optical scanning unit by performing the above measurements and calculations.

The sequence of lags in nanoseconds for hexagonal mirror disc B are as follows:

| AVG1 | AVG2 | AVG3 | AVG4 | AVG5 | AVG6 |
|---|---|---|---|---|---|
| ≈−0.5 | ≈2.5 | ≈−2.0 | ≈2.8 | ≈−3.0 | ≈−2.0 |

This sequence of deviations is unique for hexagonal mirror disc B and allows identifying the hexagonal mirror disc B when being installed into an optical scanning unit by performing the above measurements and calculations.

A hexagonal mirror disc used in an optical scanning unit may be identified on the basis of the sequence of deviations obtained by performing the above described measurements and calculations. Thus, it may be determined whether the optical scanning unit includes the hexagonal mirror disc A or the hexagonal mirror disc B without providing additional elements on the hexagonal mirror discs or additional hardware elements inside the optical scanning unit.

In the following another example for the techniques described herein for determining an identification value, which is also referred to in the following as a fingerprint identifier, for a hexagon mirror disc is described. The fingerprint identifier is determined on the basis of the prismatic error detected using the signals from the start of scan sensor 126, which, in accordance with examples, may be a photo detector, which may be an integral part of the optical scanning unit (see FIG. 5). The start of scan sensor 126 measures the beginning of each scan with an error of, for example, 0.3 ns. The duration between subsequent start of scan events may be measured by the electronics provided in the controller 128 with an accuracy of about 0.18 ns. In accordance with an example the duration may be 373.134 µs so that the temporal expression of the prismatic error in this example is 373.134±0.4026 µs per scan. The time measurement accuracy provided by the controller 128 allows detecting approximately 290 different intervals within the accuracy limit. The fingerprint identifier for the hexagonal mirror disc may be measured every time the unit starts rotating or at other events (as mentioned above). It may be calculated on the basis of an average of a predefined number of cycles or revolutions, for example 512 cycles. In accordance with examples, the duration between subsequent start of scan events, which may also be referred to as the scan-to-scan time duration, may be discretized into a predefined number of segments, e.g. into 25 segments spanning the tolerance range for the prismatic angle α between adjacent facets defined by the manufacturing specification, e.g., a range of [−15", 15"].

Figure 10:
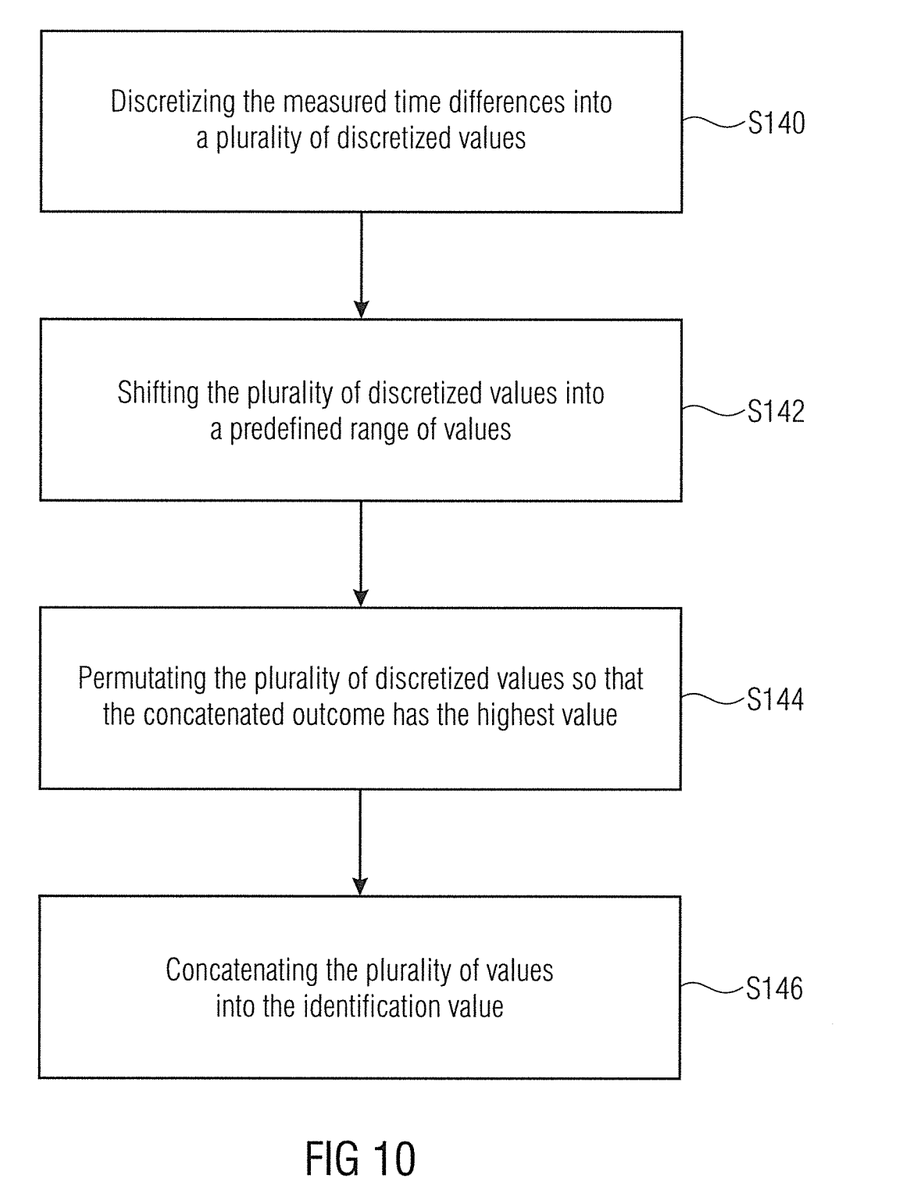
FIG. 10 is a flow diagram illustrating an example for determining a fingerprint identifier based on discretized scan-to-scan time durations.

FIG. 10 shows a flow diagram illustrating an example for determining the fingerprint identifier based on the discretized scan-to-scan time durations. At S140 the measured time differences are discretized into a plurality of discretized values, for example into the just mentioned 25 segments. This allows covering a range of about $25^5$ fingerprint identifiers. Even if the hexagon mirror discs are very well within the tolerances specified by the manufacturing specification and meet a tolerance of, for example, ±24 arc-seconds, the range of values provided is sufficient to cover about 100,000 different combinations, thereby allowing to exclusively identify any hexagonal mirror disc. Each of the discretized values, for example the six values in case of the hexagonal mirror disc, are shifted into a predefined range at S142, for example, by shifting the values by 25 so that all values are moved into the range of non-negative integers. The discretized, shifted values are concatenated into a number, for example a 12 digit number, and at S144 the concatenated values are permutated so that the value of the outcome will be the highest possible, which is, as is indicated at S146, the fingerprint identifier for the hexagonal mirror disc.

For example, the sequence of average values obtained for the hexagonal mirror disc A (see FIG. 9A) may be rounded yielding the following values: 3, −2, −8, −2, 2, 7. Shifting these values by 25 yields the following sequence: 28, 23, 17, 23, 27, 32. The sequence is permutated so that the concatenated outcome will have the highest value, namely 322827232317, which is the fingerprint identifier for the hexagonal mirror disc A.

The discretization process may affect the angle proportion calculation, and may yield a hexagonal mirror disc having summed facet angles α of more or less than six times 120° along its circumference. This outcome may be the result of a high frequency jitter due to abrupt changes of the rotation speed. In order to reduce the influence of such factors on the accuracy of the calculations, those measurements for cycles or revolutions are screened out for which a "checksum" insinuates that the overall circumscribed angles are different from 720°.

In accordance with examples, the checksum is calculated as follows. The sequence of the six integers representing the prismatic error may be calculated 500 times to provide a final measurement result. Minor changes of, e.g., the rotation speed of the mirror within a revolution, may cause some of the rounded values to vary within a revolution. In such a case the sum of all six rounded errors will not be zero. Since such a case is physically not possible, the checksum may be calculated for each revolution, e.g., by adding all six values to consider whether a measurement may be taken into account. For example, when considering the sequence of values obtained for the hexagonal mirror disc A (see FIG. 9(a)) during one revolution the values (rounded) (3), (−2), (−8), (−2), (2), (7) may be obtained. For these values the sum is (3)+(−2)+(−8)+(−2)+(2)+(7)=0. Thus, this measurement is considered valid. On the other hand, when considering the sequence of values obtained for the hexagonal mirror disc B (see FIG. 9(b)) during one revolution the values (rounded) (−1), (3), (−2), (3), (−3), (−2) may be obtained. For these values the sum is (−1)+(3)+(−2)+(3)+(−3)+(−2)=−2. Thus, this measurement is considered not valid and is screened out. For example, from the 500 measurements, those with a checksum #0 are excluded, and from the combinations having a checksum=0, the most common may be chosen.

Figure 11:
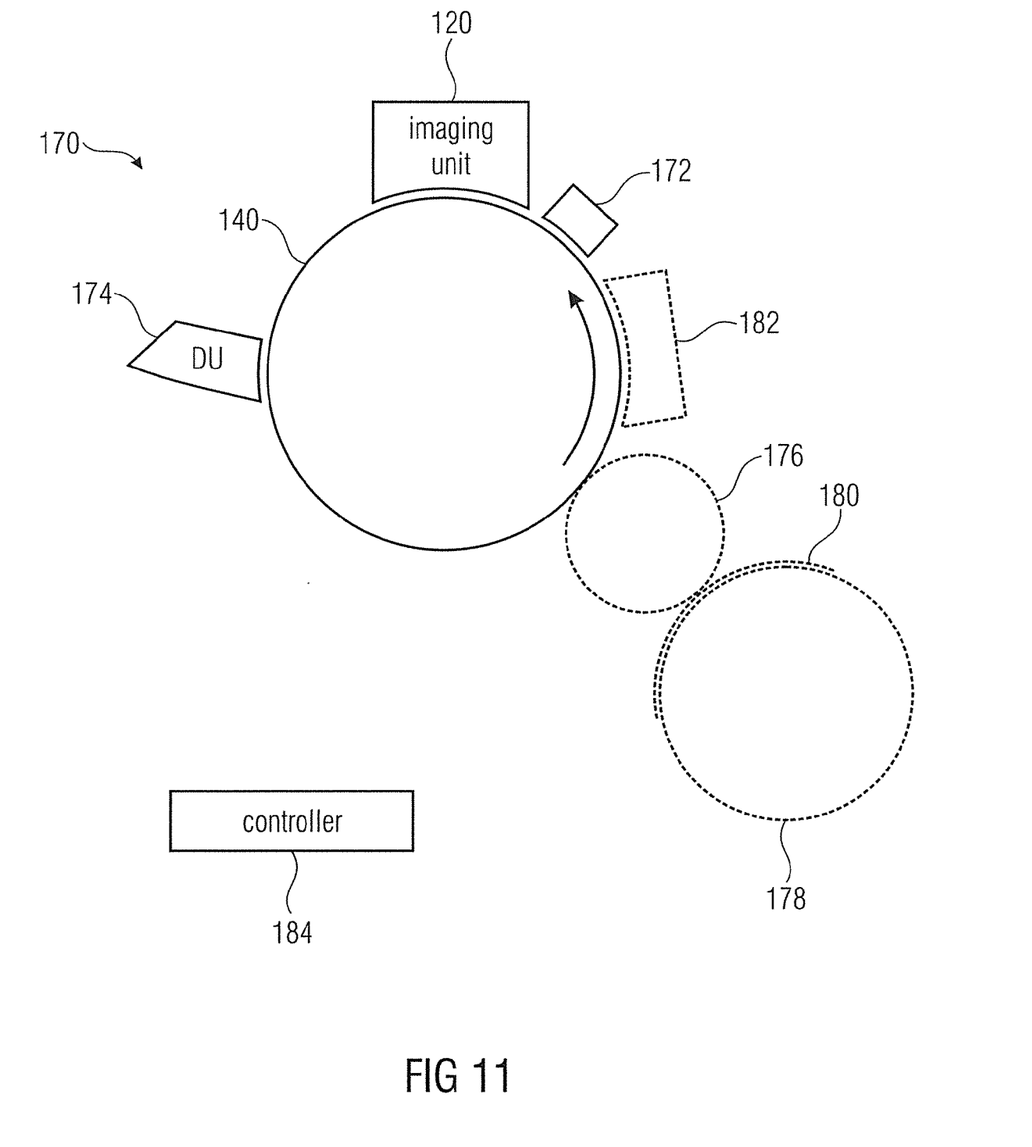
FIG. 11 is a block diagram of a liquid electro-photographic (LEP) printing system according to an example.

FIG. 11 is a block diagram of a liquid electro-photographic (LEP) printing system 170 according to an example implementing the techniques described herein. The printing system 170 includes the photoconductor member 140 which may be in the form of a drum, although another example of the photoconductor member 140 may have a different form, such as a continuous belt. In operation, the photoconductor member 140 rotates in the direction shown by the arrow. A charging unit 172 generates a substantially uniform electrical charge on a surface of the photoconductor member 140, for example in a range of about 800V to 1100V. The printing system 170 further includes the optical scanning unit 120 (also referred to as imaging unit) to selectively dissipate an electric charge on the photoconductor member 140 by selectively emitting light onto the surface of the photoconductor member 140. The imaging unit 120 of the printing system 170 may provide for a functionality for determining an identification value of the hexagonal mirror disc provided therein, and in accordance with examples it may be structured in a way as described with regard to FIG. 5. The optical scanning unit 120 selectively dissipates charge in accordance with an image to be printed. The optical scanning unit 120 creates a latent electrostatic image on the surface of the photoconductor member 140 that comprises charged areas and non-charged areas that correspond to portions of the image that are to receive toner, and portions of the image that are not to receive toner. A developer unit 174 electrostatically transfers liquid toner stored therein to the surface of the photoconductor member 140 according to the latent image thereon. Once the image has been developed on the photoconductor member 140 it may be electrostatically transferred to an intermediate transfer member 176 for onward transfer, under pressure from an impression roller 178 to a medium 180. In other examples the image developed on the photoconductor member 140 may be transferred directly to the medium 180 without the use of an intermediate transfer member 176. In some examples a cleaning unit 182 may be provided to remove any traces of toner remaining on the surface of the photoconductor member 140 after transfer of the image either to the intermediate transfer member 176 or directly to the medium 180 as well as to dissipate any residual electrical charges on the surface of the photoconductor member 140. Depending on the size of the photoconductor member 140 and the size of the image to be printed, a latent image corresponding to just a portion of the image to be printed may be present on the photoconductor member 140 at a time.

The printing system 170 further includes a printer controller 184, and the operation of the printing system may be generally controlled by the printer controller 184. The printer controller 184 may comprise a processor, such as a microprocessor, coupled to a memory through an appropriate communications bus. As mentioned above, in accordance with examples, the controller 128 and the memory 130 of the optical scanning unit 120 may be part of or may be implemented by the printer controller 184.

In the example shown in FIG. 11 a single developer unit 174 is shown, although in other examples, more developer units may be provided which may include toners of different color.

Although some aspects of the techniques described herein have been described in the context of an apparatus, these aspects may also represent a description of the corresponding method, where a block or device corresponds to a method step or a feature of a method step. Analogously, aspects described in the context of a method step also represent a description of a corresponding block or item or feature of a corresponding apparatus.

All of the features disclosed in this specification, including any accompanying claims, abstract and drawings, and/or all of the steps of any method or process so disclosed may be combined in any combination, except combinations where at least some of the features and/or steps are mutually exclusive. Each feature disclosed in this specification, including any accompanying claims, abstract and drawings, may be replaced by alternative features serving the same, equivalent or similar purpose, unless expressly stated otherwise. Thus, unless expressly stated otherwise, each feature disclosed is one example of a generic series of equivalent or similar features.

The invention claimed is:

1. A method, comprising:
    determining an identification value of a rotatable element having a plurality of mirror facets, wherein the identification value is determined based on a facet scan duration obtained of the mirror facets or a prismatic error of the mirror facets;
    analyzing facet scan durations for the mirror facets to reveal a relative lag among the mirror facets that reflects the prismatic error; and
    combining a sequence of lags for each mirror facet to form the identification value.

2. The method of claim 1, comprising:
    detecting a start of scan event indicative of a beginning of a scan by a mirror facet, wherein the facet scan duration is the time difference between consecutive starts of scan events;
    measuring the time difference between consecutive start of scan events; and
    combining the measured time differences to form the identification value.

3. The method of claim 2, comprising for a complete rotation of the rotatable element:
    detecting the time of start of scan events;
    measuring the time differences between consecutive start of scan events;

averaging the measured time differences to obtain an average time between the consecutive starts of scan events;

for each mirror facet, determining the deviation of the measured time difference from the average time; and combining the deviations to form the identification value.

4. The method of claim 3, comprising:

repeating the detecting, the measuring, the averaging and the determining over a plurality of complete rotations of the rotatable element; and averaging the deviations for each mirror facet over the plurality of complete rotations of the rotatable element;

wherein the combining comprises combining the averaged deviations for the mirror facets to form the identification value.

5. The method of claim 2, comprising:

discretizing the measured time differences into a plurality of discretized values, and concatenating the plurality of values into the identification value.

6. The method of claim 5, comprising:

shifting the plurality of discretized values into a predefined range of values.

7. The method of claim 5, comprising:

permutating the plurality of discretized values so that the concatenated outcome has the highest value.

8. An optical scanning unit, comprising:

a rotatable element having a plurality of mirror facets; and a controller to determine an identification value of the rotatable element based on a facet scan duration obtained of the mirror facets or based on a prismatic error of the mirror facets, wherein the controller is to:

analyze facet scan durations for the mirror facets to reveal a relative lag among the mirror facets that reflects the prismatic error; and combine a sequence of lags for each mirror facet to form the identification value.

9. The optical scanning unit of claim 8, further comprising:

a sensor to detect a start of scan event indicative of a beginning of a scan by a mirror facet, wherein the facet scan duration is the time difference between consecutive starts of scan events.

10. The optical scanning unit of claim 8, wherein the controller is to measure the time difference between consecutive starts of scan events and to determine the identification value based on a combination of measured time differences.

11. The optical scanning unit of claim 8, comprising a memory element to store the identification value.

12. The optical scanning unit of claim 8, comprising a laser source to provide a laser beam to be scanned by the mirror facets.

13. An electrostatic printing system, comprising:

an optical scanning unit including a rotatable element having a plurality of mirror facets, and a controller to determine an identification value of the rotatable element based on a facet scan duration obtained of the mirror facets or based on a prismatic error of the mirror facets, wherein the controller is to:

analyze facet scan durations for the mirror facets to reveal a relative lag among the mirror facets that reflects the prismatic error; and combine a sequence of lags for each mirror facet to form the identification value.

14. The electrostatic printing system of claim 13, wherein the controller, for a plurality of complete rotations of the rotatable element, detects from a start of scan sensor the time of start of scan events, measures the time differences between consecutive starts of scan events, averages the measured time differences to obtain an average time between the consecutive start of scan events, and determines for each mirror facet the deviation of the measured time difference from the average time; and wherein the controller averages the deviations for each mirror facet over the plurality of complete rotations of the rotatable element and combines the averaged deviations for the mirror facets to form the identification value.

* * * * *